US006823601B2

(12) United States Patent
Murray (10) Patent No.: US 6,823,601 B2
(45) Date of Patent: Nov. 30, 2004

(54) APPARATUS FOR USE WITH A 3D IMAGE WHEEL ALIGNER FOR FACILITATING ADJUSTMENT OF AN ADAPTIVE CRUISE CONTROL SENSOR ON A MOTOR VEHICLE

(75) Inventor: Patrick Murray, Cork (IE)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

(21) Appl. No.: 10/454,665

(22) Filed: Jun. 5, 2003

(65) Prior Publication Data

US 2004/0049930 A1 Mar. 18, 2004

(30) Foreign Application Priority Data

Sep. 17, 2002 (IE) .......................................... S2002/0747

(51) Int. Cl.⁷ ............................. G01B 5/25; G01B 11/27
(52) U.S. Cl. ............................. 33/288; 33/600; 33/645
(58) Field of Search .............................. 33/203, 275 R, 33/281, 282, 285, 286, 288, 533, 534, 600, 613, 645

(56) References Cited

U.S. PATENT DOCUMENTS

| | | | |
|---|---|---|---|
| 5,274,433 A | * 12/1993 | Madey et al. ................. | 33/288 |
| 5,421,095 A | * 6/1995 | Matteucci .................... | 33/203 |
| 5,535,522 A | 7/1996 | Jackson | |
| 5,592,383 A | * 1/1997 | Rogers et al. ................ | 33/286 |
| 5,724,128 A | * 3/1998 | January ....................... | 33/288 |
| 5,724,743 A | 3/1998 | Jackson | |
| 5,809,658 A | 9/1998 | Jackson et al. | |
| 5,842,281 A | * 12/1998 | Mieling ........................ | 33/600 |
| 5,909,940 A | * 6/1999 | Baldock ....................... | 33/533 |
| 5,943,783 A | 8/1999 | Jackson | |
| 6,040,903 A | * 3/2000 | Lysen et al. .................. | 33/645 |
| 6,087,995 A | 7/2000 | Grace et al. | |
| 6,115,927 A | * 9/2000 | Hendrix ....................... | 33/288 |
| 6,363,619 B1 | 4/2002 | Schirmer et al. ............. | 33/288 |
| 6,480,104 B1 | * 11/2002 | Wall et al. .................... | 33/286 |
| 6,583,868 B2 | * 6/2003 | Hopfenmuller .............. | 33/288 |
| 2001/0008446 A1 | 7/2001 | Hopfenmuller | |
| 2001/0039912 A1 | * 11/2001 | Sutton ......................... | 33/286 |
| 2002/0189115 A1 | * 12/2002 | Jackson et al. .............. | 33/286 |
| 2004/0049930 A1 | * 3/2004 | Murray ........................ | 33/288 |

FOREIGN PATENT DOCUMENTS

| | | |
|---|---|---|
| DE | 196 42 811 A1 | 4/1998 |
| DE | 19857871 C1 | 10/2000 |
| DE | 101 14 799 A1 | 10/2002 |
| EP | 1 260 832 | 11/2002 |
| EP | 0 984 297 B1 | 3/2003 |

* cited by examiner

Primary Examiner—G. Bradley Bennett
(74) Attorney, Agent, or Firm—McDermott Will & Emery LLP (57) ABSTRACT

An image processing type aligner enables proper set-up of one of two optical adjustment elements used to align an adaptive cruise control sensor or the like mounted on a vehicle. One element, such as a laser beam source, is mounted with the sensor on the vehicle; and the other element, such as a mirror, is mounted on a stand. A carrier on the stand positions two optical targets of the aligner at transversely spaced apart locations. The stand is positioned between the vehicle and the aligner and manipulated until the aligner indicates that the axis of the adjustment element on the stand is aligned relative to the thrust line of the vehicle. A beam of light is transmitted between the two adjustment elements, and the technician adjusts the sensor until the beam position indicates a desired alignment of the sensor relative to the thrust line.

27 Claims, 4 Drawing Sheets

APPARATUS FOR USE WITH A 3D IMAGE WHEEL ALIGNER FOR FACILITATING ADJUSTMENT OF AN ADAPTIVE CRUISE CONTROL SENSOR ON A MOTOR VEHICLE

TECHNICAL FIELD

The present subject matter relates to techniques and equipment to adjust the alignment of a vehicle mounted sensor, typically the leading vehicle sensor of an adaptive cruise control system, in part using an image processing type aligner, such as a 3D visual system otherwise used for alignment of the wheels of the host vehicle.

BACKGROUND

Adaptive cruise control systems provide an adaptive vehicle speed control, based on sensing of another vehicle or target in front of the host vehicle within which the cruise control operates. Cruise control normally controls host vehicle speed to minimize a difference between actual vehicle speed and a driver-set speed. The adaptive speed control senses the presence of a vehicle or the like in front of the host vehicle and adjusts the cruise control algorithm to account for the target preceding the host vehicle, for example to reduce host vehicle speed and maintain a set distance between the vehicles. A number of different types of automobile manufacturers offer such adaptive cruise control as a comfort aid for driving.

Adaptive cruise control (ACC) systems typically utilize a radar or laser sensor or the like to detect the presence of and distance to a target vehicle leading the host vehicle on which the sensor and the ACC system are mounted. Adaptive cruise control sensors are now commonly mounted on motor vehicles, such as cars, trucks, lorries, vans and the like. Such an adaptive cruise control sensor is located to the front of the host vehicle, generally in the front bumper, and directs a radar beam forwardly in the direction of forward motion of the motor vehicle. Based on the return signal, whenever the sensor detects another vehicle in front of and in the path of the host vehicle, which is moving at a speed slower than the speed of the host vehicle, the adaptive cruise control system determines the speed of the leading vehicle from the sensor signal. The control of the adaptive system sets the cruise speed of the host vehicle to the speed of the leading vehicle.

In order for such an adaptive cruise control system to operate properly, the sensor must be aligned with the vehicle thrust line, and implementation of such a system requires accurate alignment of the sensor with that thrust line. It is essential that the sensor axis, and thus the axis along which the sensor emits a radar or laser beam, extends parallel to the thrust line of the vehicle. In certain cases, the axis of the adaptive cruise control sensor may coincide with the thrust line, although in general, the axis of the adaptive cruise control sensor tends to be spaced apart from the thrust line, but must be parallel thereto.

The thrust line of a vehicle is determined by the toe of the rear wheels of the vehicle, and techniques for measurement thereof will be well known to those skilled in the art. It is a line that extends from the point of intersection of the rear transverse axis of the rear wheels and the longitudinal center line of the vehicle, and it extends forwardly of the vehicle at an angle to the center line of the vehicle. The angle that the thrust line makes with respect to the center line of the vehicle is determined by the toe of the rear wheels, and is relatively small.

Devices for aligning the axis of an adaptive cruise control sensor are known. In general, such a device comprises a mirror and a laser beam. An arrangement is provided for mounting the mirror or the laser light beam source forwardly of the vehicle for cooperating, with the other of the source and the mirror, which is mounted on the adaptive cruise control sensor. Typically, the laser light beam source is mounted on the adaptive cruise control sensor, and the source is arranged with its axis, and in turn, the axis at which the light beam is projected, extending parallel to and relatively close to the axis of the adaptive cruise control sensor. In this arrangement, the mirror is mounted on a separate stand or the like in front of the vehicle.

German published patent application DE 19857871 (C1) discloses a device for aligning the sensor of an adaptive cruise control system to the thrust line of the host vehicle. The disclosed device uses a laser source mounted on a frame positioned in front of the automobile, for directing a laser beam onto a mirror provided by the radar sensor perpendicular to the propagation direction of the radar beam. The rear wheels of the automobile have angle sources, which are used for alignment of the frame with the automobile longitudinal axis in conjunction with angle sources at the opposite sides of the frame, with correction of the radar sensor using evaluation of the reflected laser beam.

Where the mirror is the separately mounted element, it is essential that the mirror is aligned with the vehicle such that the mirror extends transversely across the vehicle thrust line, that is to say perpendicular to the thrust line. In general, it is difficult to locate the mirror so that it accurately extends perpendicular to the thrust line. In cases where the mirror is mounted on the adaptive cruise control sensor, the mirror is mounted transversely of the vehicle thrust line, and the laser light beam source is separately mounted. In this later case, the laser light beam source must be located with the axis of the light beam source extending parallel to the thrust line. It is often difficult to accurately align the laser light beam source on a mounting with the beam source axis extending parallel to the thrust line.

It is well known to align the front and rear wheels of a vehicle with alignment devices or systems. Modem wheel alignment systems, providing increased accuracy and ease of use, have relied on visible targets and computer processing of camera images of the wheel mounted visible targets. Such systems are often referred to as 3D image wheel aligner systems. Examples of methods and apparatus involving computerized image processing for alignment of motor vehicles are described in U.S. Pat. No. 5,943,783 entitled "Method and apparatus for determining the alignment of motor vehicle wheels;" U.S. Pat. No. 5,809,658 entitled "Method and apparatus for calibrating cameras used in the alignment of motor vehicle wheels;" U.S. Pat. No. 5,724,743 entitled "Method and apparatus for determining the alignment of motor vehicle wheels;" and U.S. Pat. No. 5,535,522 entitled "Method and apparatus for determining the alignment of motor vehicle wheels." A wheel alignment system of the type described in these references is sometimes called a "3D aligner" or "visual aligner." An example of a commercial vehicle wheel aligner is the Visualiner 3D, commercially available from John Bean Company, Conway, Ark., a unit of Snap-on Tools Company.

The prior adaptive cruise control sensor alignment devices, including that disclosed in DE 19857871 (C1), have been designed for use with older alignment measurement heads. In view of the increased accuracy and ease of use, it would be advantageous if the 3D type visual aligner systems could be used to also perform alignment of an adaptive cruise control sensor. The prior adaptive cruise control sensor alignment devices, however, do not work with the more modern 3D type visual aligner systems, due to limiting parameters of the 3D visual aligner and/or the sensor itself.

Hence a need exists for an apparatus for use with a visual aligner system, such as used for wheel alignments, to allow the aligner to also perform an alignment of the sensor of the adaptive cruise control system on a host vehicle. There is an attendant need for a method that facilitates the alignment of an adaptive cruise control sensor of a vehicle using a 3D image wheel aligner.

SUMMARY

Techniques and equipment are contemplated for aligning an adaptive cruise control sensor or the like mounted on a host vehicle, using two optical adjustment elements and using an image processing type aligner to properly set-up at least one of those elements to perform the sensor alignment.

A sensor alignment method, for example, involves mounting a first one of the optical adjustment elements in alignment with an axis of the adaptive cruise control sensor. As mounted, this element is movable together with the sensor during adjustment of the sensor. The other adjustment element is mounted on a stand. The method also entails mounting two optical targets of the image processing type aligner on the stand. As mounted, the targets are positioned at transversely spaced apart locations, relative to an axis of the adjustment element that is mounted on the stand. The method also involves positioning the stand, with the second adjustment element and the targets, between the front of the host vehicle and the image input device(s) of the image processing wheel aligner. The optical targets are located so as to allow imaging thereof by the aligner, to determine one or more alignment parameters. The aligner system obtains and processes one or more images of the optical targets, and the position of the stand is adjusted, until the axis of the second adjustment element is aligned relative to the thrust line of the host vehicle. Adjustment of the sensor then involves transmitting a beam of light between the two adjustment elements and adjusting the position of the sensor until the beam of light is positioned so as to indicate a desired alignment of the axis of the adaptive cruise control sensor relative to the thrust line of the host vehicle.

In a disclosed example, the alignment of the stand and adjustment element uses data already stored in the 3D image wheel aligner relating to the toe-in angles of the rear wheels of the vehicle and in turn the location of the thrust line. A front toe analysis may be used to determine when an axis of the targets is perpendicular to the thrust line, and thus when the element on the stand is aligned with the thrust line of the vehicle. In the examples, the adjustment elements consist of a laser beam source and a reflector, typically a flat mirror. In such examples, an adjustment method might entail directing light from the laser light beam source at the light reflector, and adjusting the orientation of the adaptive cruise control sensor until the reflector is coincident with the laser light beam from the laser beam light source, for in turn aligning the axis of the adaptive cruise control sensor with the thrust line of the vehicle.

An apparatus useful as the stand in such a process includes a primary support, for positioning between the image sensor(s) of the wheel aligner and the front of the host vehicle. A secondary support is located on the primary support, for carrying either the laser light beam source or the light reflector. In practice, the beam source or reflector on the secondary support co-operates with the other of those adjustment elements, which is associated with the adaptive cruise control sensor on the host vehicle, for aligning the adaptive cruise control sensor axis parallel to the thrust line of the host vehicle. The apparatus also includes a carrier located on the secondary support. The carrier provides mountings for the two optical targets of the image processing wheel aligner at transversely spaced apart locations relative to a longitudinal central axis of the vehicle. The mounting of the targets facilitates alignment of the laser light beam source or reflector mounted on the secondary support, with respect to the thrust line of the host vehicle.

In one example, the secondary support is adapted for mounting the light reflector. Ideally, the light reflector is aligned with the thrust line of the vehicle so that light incident on the light reflector from the laser light beam source is reflected back along its own path, when the laser light beam incident on the light reflector is parallel to the thrust line. In one such example, the light reflector comprises a flat mirror, and the mirror is located on the secondary support with its flat reflecting surface extending transversely of the thrust line of the vehicle. In an example, the secondary support is rotatable about a vertical axis relative to the primary support, for facilitating alignment of the light reflector with the thrust line of the vehicle.

The carrier may be adapted so that the respective targets are rotatable about a horizontal axis for facilitating alignment of the targets with the cameras of the image processing type aligner. In such an example, the carrier comprises an elongated carrier bar. The carrier bar may rotatable about the horizontal axis; or mountings at the end of the bar may allow rotation of the targets about the horizontal axis, to facilitate certain aligner measurements that may be useful in aligning the stand relative to the thrust line of the vehicle.

In the disclosed examples, the carrier locates the respective targets spaced apart by a distance approximately corresponding to the distance the respective targets would be spaced apart if they were located on respective opposite wheels of the vehicle.

Also, the secondary support may be height adjustable relative to the primary support. Furthermore, a mounting means may be provided on the secondary support for carrying the laser light beam source or the light reflector. This mounting means is pivotal about a vertical axis and facilitates pivotal movement of the adjustment element relative to the secondary support, for example, for aligning the element with the carrier (and thus with respect to the targets).

A system for adjusting a sensor, such as an adaptive cruise control sensor on a vehicle, would include the adjustment elements, a stand like one of the examples disclosed in this case, and a visual aligner with its associated optical targets.

Those skilled in the art will recognize that the techniques described herein may be adapted to other applications. For example, the stand and adjustment elements could be used in combination with a visual image processing type system to align other types of sensors, e.g. including other sensors that may now or in future appear at different locations on various types of vehicles.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

A system for aligning a vehicle mounted sensor, such as an adaptive cruise control sensor mounted on the front of a host vehicle, utilizes an image processing aligner. The aligner includes one or more image sensors and a processor for processing image signals from the image sensors so as to compute alignment parameters, for example, parameters relating to wheel alignment of the vehicle. The aligner uses two or more optical targets. For a sensor-related application, the aligner also serves to align one or more optical adjustment elements used in the adjustment and alignment of the vehicle mounted sensor.

A first one of the optical adjustment elements is mountable in alignment with an axis of the sensor and for movement with adjustment of the sensor on the vehicle. The sensor alignment system also includes a stand for location between the host vehicle and the image sensor(s) of the aligner. The stand supports the second optical adjustment elements. The stand also supports the optical targets, at transversely spaced apart locations relative to an axis of the host vehicle, to enable imaging of the targets on the stand to allow use of the aligner. Two examples of the stand structure will be discussed in detail, below, with respect to FIGS. 1 and 8. The aligner processes images of the targets on the stand to facilitate alignment of the second optical adjustment element relative to the axis determined from the host vehicle, for example, in relation to a thrust line of the vehicle.

Referring to the drawings and initially to FIGS. 1 to 7, there is illustrated apparatus, indicated generally by the reference numeral 1, for use with a 3D image wheel aligner, indicated generally by the reference numeral 2, for facilitating alignment of an adaptive cruise control sensor 4 of a motor vehicle 5. The apparatus 1 includes one of the two sensor adjustment elements, e.g. a reflector or a light beam source, and a stand supporting the one adjustment element.

Before describing the apparatus 1 in detail, the 3D aligner 2 will first be described. Although other commercially available image processing type aligners may be used, in this example, the image processing aligner 2 is a wheel aligner sold by the John Bean Company under the Trademark VISUALINER 3-D wheel aligner. The system 2 for aligning the elements on the vehicle 5 comprises three major components shown generally in FIGS. 2 and 3. The first of these elements is an illumination and imaging system. This portion of the system comprises two imaging modules 10 mounted on a main elongated transversely extending housing or beam 8, which in turn is supported on a pair of pillars 9.

Each of the imaging modules 10 includes a light emitter or illumination system (typically a strobe). Each of the imaging modules 10 also includes an image sensor, typically in the form of a digital camera. Essentially, each camera forms an image of objects within its filed of view, which in operation includes one or more targets 12; and in response to the image, each camera generates digital image data.

In an exemplary system 2, each light emitter takes the form of a strobe comprising an array of flashing red LEDs mounted around the aperture of one of the cameras. The system uses high-resolution digital cameras. The imaging modules 10 are mounted at opposite ends of the horizontal beam 8. The beam 8 provides desired separation between the modules, to allow the desired view of the vehicle wheels from opposite sides. The height of the beam 8, and thus the height of the cameras in the modules 10, may be fixed by the height of the pillars 9, or the height may be adjustable. Those skilled in the art will recognize that such visual wheel alignment systems may use a single imaging module or use more than the two modules 10 shown in the example.

The second major element of the visual aligner 3D system 2 is a set of four optical targets, in this case, in the form of four passive target heads 12. During a normal wheel alignment, the target heads 12 are attached to the vehicle wheels. As discussed more, later, for the adaptive cruise control sensor alignment, two of the target heads 12 are attached to the back wheels of the vehicle 5 in the normal manner, but two the target heads 12 are moved from the front wheels to the apparatus 1 for facilitating the alignment of the sensor adjustment elements (see FIG. 3).

Each target head 12 includes a wheel-rim clamp and an attached optical target object. In the VISUALINER 3D example, each target object has a planar, light-reflective surface with a plurality of visually perceptible, geometrically configured, retro-reflective target elements, which appear as a pattern of reflective circles or dots of different sizes on the planar surface. Examples of target bodies and target elements acceptable for use in visual wheel alignment applications are described in U.S. Pat. No. 5,724,743. Other target designs may be used for wheel alignment, for example with different visually perceptible target elements. An example of an attachment apparatus is described in U.S. Pat. No. 5,024,001, entitled "Wheel Alignment Rim Clamp Claw" issued to Borner et al. on Jun. 18, 1991. Of course other mounting arrangements may be used, e.g. in other visual aligner systems.

The beam 8 supporting the imaging modules 10 has a length sufficient to position the cameras of the modules 10 outboard of the sides of the vehicle 5, so as to allow imaging of the targets 12 by the visual aligner system 2. Also, the beam 8 and pillars 9 position the cameras in the modules 10 high enough above the shop floor to ensure that the targets on the left side of the vehicle are both within the field of view of the left side camera in the left module, and the two targets on the right side of the vehicle are both within the field of view of the camera in the right side module.

The other major element of the aligner system 2 is a programmed computer or other host processor, typically a personal computer or similar programmable data processing device, which may be housed within the cabinet 13. In a typical implementation, the computer includes a microprocessor, a keyboard, a mouse, a printer and a color display monitor. In the alignment applications, the computer is programmed to receive and process the image data from the imaging modules 10. The host computer processes the received data to calculate alignment parameters for a vehicle 5 and to provide a graphical three-dimensional representation of those parameters as a display to a mechanic. In general, the host processing system processes the image information to derive positional data regarding position of the visually perceptible target elements 12 from the camera images; and the host processing system processes the positional data to determine one or more wheel alignment parameters of the vehicle 5 under test. As discussed more below, the host processing system performs analogous processing of the image data to enable alignment of equipment used for the adjustment of the adaptive cruise control sensor 4. The computer may also offer a variety of other information useful in adjusting vehicle alignment, for example, relating to relevant manufacturer's data regarding different makes and models of motor vehicles. The computer also provides the user interface for operation of the system 2.

In a wheel alignment operation, the target heads 12 are attached to the wheel rims, and then, each target head is oriented so that the target elements on the target body face toward the camera in the respective imaging module 10. The vehicle type and model year can then be entered into the computer along with other identifying parameters, such as vehicle VIN number, license number, owner name, etc.

To take wheel alignment measurements, the mechanic begins by operating the system 2 to take a first set of images of the targets 12. The mechanic then roles the vehicle 5 back a slight distance, up to eight inches; and the system 2 takes another set of images of the targets 12. Finally, the mechanic rolls the vehicle 5 forward to its initial position, and the system 2 takes more images. For each of the images, the respective module 10 provides image data to the host computer in the cabinet 3, for processing. For example, from the position and orientation of the targets in the images taken at the various positions, the host computer calculates the actual position and orientation of each wheel axis, including certain alignment parameters such as toe, camber, thrust angle and setback.

In the exemplary system 2, one camera is referenced to the other, so that the host computer utilizes a single coordinate system for modeling the vehicle under test. It is not necessary that the supporting rack or floor be level or even that all wheels lie within the same plane. For each vehicle 5, the computer defines a reference plane that passes through the axles as determined from the two test images taken at different positions of the wheels. Since one of the axles may not lie in the plane defined by the other three wheels, some liberties must be taken. For example, for the purpose of aligning the front wheels, the computer defines a reference plane as that formed by the measured axle location of each of the two front wheels and a point midway between the measured axle locations of the rear wheels. Front wheel alignment calculations then are referenced to this individually measured plane. A similar technique may be used to reference measurements and adjustments with respect of the rear wheels.

Once all wheel alignment measurements are complete, the computer generates a visual output of the measured alignment parameters and/or provides data relating to adjustments needed to bring the alignment parameters back to original manufacturer's specifications. The computer stores manufacturer-specified values and tolerances for the alignment parameters of many vehicles, and retrieves the appropriate information based on the make and model information input by the mechanic. The mechanic may take corrective action, for example, by making adjustments and/or replacing worn parts, and then repeat the process to confirm that the corrective action resulted in appropriate alignment of the vehicle wheels. If necessary, the mechanic may repeat one or more steps of correcting alignment and re-testing, until all parameters are within acceptable tolerances. When complete, the system can provide visual displays and/or printouts, for purposes of billings, reports to the customer, etc.

As part of the vehicle measurement operations, the electronic circuitry in a cabinet 13 computes the toe angles of the respective wheels from images of the target heads 12 and determines the amount of correction (if any) required to the respective toe angles of the front and rear wheels.

The angle $\alpha$ of the thrust line 14 from the centerline 15 of the vehicle is also determined by the electronic circuitry. For example, the electronic circuitry of the 3D aligner 2 may compute the thrust line 14 of the vehicle 5, from the toe values (corrected if necessary) of the rear wheels of the vehicle. The thrust line data and possibly the toe angle data is stored for use in the subsequent sensor alignment operation. Knowing the angle $\alpha$ of the thrust line from the centerline 15 of the vehicle, the adaptive cruise control sensor 4 can thus be aligned so that the axis 16 of the adaptive cruise control sensor 4 extends parallel to the thrust line 14.

Two optical adjustment elements are used in the adjustment of an adaptive cruise control sensor mounted on the front of a host vehicle. One of these elements typically is a source of a visible light beam, such as a laser beam source 38. In such case, the other adjustment element is a reflector, typically in the form of a flat reflecting mirror. As discussed later, with regard to calibration procedures, the exemplary mirror 30 is a double-sided mirror 30. To facilitate alignment of the adaptive cruise control sensor 4, either the beam source or the mirror is supported along the sensor axis; and the other one of the beam source and the mirror is arranged across the axis at a distance from the sensor. Accurate alignment of the sensor 4 requires careful arrangement of the mirror and/or the beam source. The support apparatus 1 facilitates arrangement of the mirror or beam source relative to the sensor axis and the thrust line and detection of alignment thereof relative to the thrust by the visual aligner system 2.

Figure 1:
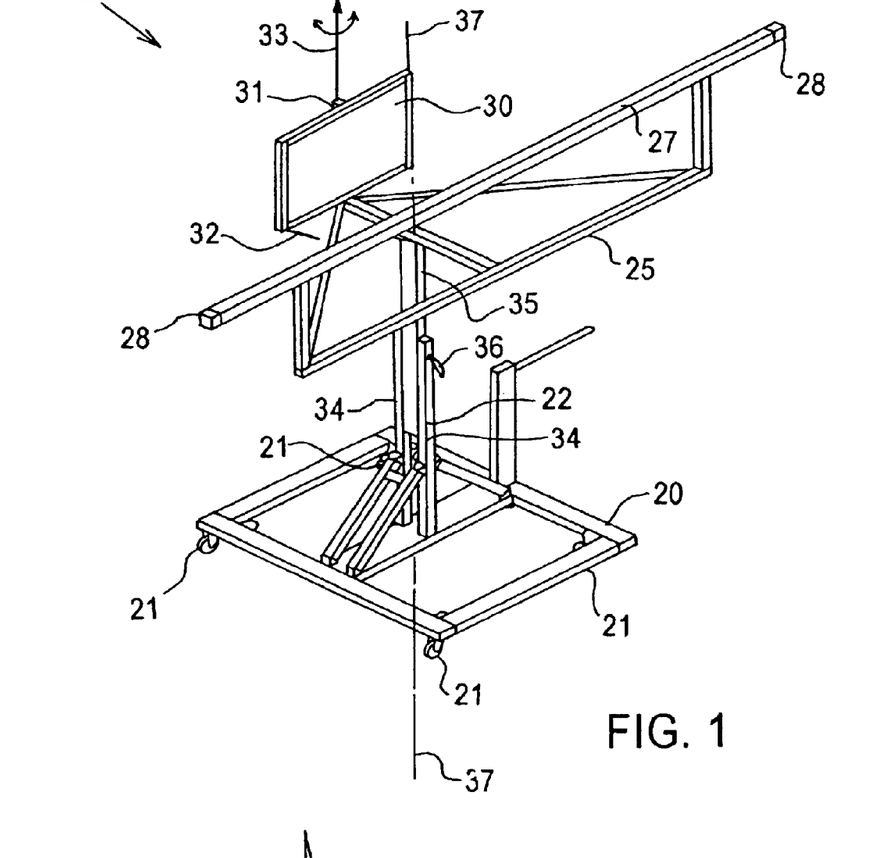
FIG. 1 is a perspective view of a stand and an adjustment element for facilitating adjustment of an adaptive cruise control sensor of the vehicle using an image processing type wheel aligner.

Turning now to the apparatus 1, the apparatus 1 includes a stand and one of the adjusting elements, in this case, the mirror 30. The stand comprises a primary support. In the example of FIG. 1, the primary support includes a ground-engaging framework 20, which may be supported on four castors 21. A central pedestal 22 extending upwardly from the ground engaging framework 20 carries a secondary support, in this example, a secondary framework 25.

The secondary framework 25 in turn supports a carrier, for example, an elongated carrier bar 27. During alignment of an adaptive cruise control sensor, the bar 27 carries two of the respective target heads 12, at respective opposite ends of the carrier bar 27. A pair of mounting members 28 are mounted at respective opposite ends of the carrier bar 27. The mounting members 28 enable independent rotation of each target about a horizontal axis. This allows pivoting of the target heads 12 about the horizontal axis, for aligning the target heads 12 with the field of view 29 of the cameras in the imaging modules 10 of the 3D aligner 2. Once aligned with the cameras in the imaging modules 10, the target heads may be rigidly clamped in position in relation to the bar 27.

Each of the mounting members 28 may comprise a plate rigidly attached to the respective end of the bar 27 in combination with the same adjustable clamp used to mount the target head to the vehicle wheel rim, such as that described in the above-noted U.S. Pat. No. 5,024,001 to Borner et al. Different mounting members 28 may be used for different types of clamp or support associated with the target heads 12. For example, if the clamps provide rigid support of the target heads, the mounting members 28 may be rotatable.

In this example, the carrier bar 27 is of sufficient length for locating the target plates 12 at the respective ends of the carrier bar 27 so that the target heads when mounted on the carrier bar 27 occupy respective positions that are spaced apart approximately the same distance (e.g. ±15%) as the target heads 12 would be spaced apart if mounted on the respective front or rear wheels of the vehicle 5.

Although not readily visible in the drawings, the bar 27 may be attached to the secondary framework 25 via bearings or the like, in such a manner that the bar 27 (and any attached targets 12) may be rotated about the horizontal axis of the bar 27. Essentially, the bar 27 and attached targets rotate as one. Rotation of the bar and targets simulates wheel rotation as used in a toe-in measurement. The simultaneous rotation of the targets 12 minimizes errors due to run-out and eccentricity of the bar 27 and its mountings. Due to the nature of the aligner calculations, this will result in the two targets giving a reading for total toe (in relation to the apparatus 1) that is close to or equal to 0 degrees.

Alternatively, the bar 27 can be mounted securely on the framework 25 and bearings provided at both ends for the target mounting members 28. This would allow separate rotation of the targets for toe calculation, a process also possible as part of the visual aligner system operation.

The secondary support framework 25 is also adapted for mounting either one of the two optical sensor adjustment elements. The secondary support framework 25 may support either the laser light beam source or the light reflector, for co-operating with the other of the two adjustment elements, which would be mounted on the adaptive cruise control sensor 4 for facilitating alignment of the adaptive cruise control sensor 4 with the thrust line 14. In this example, the secondary framework 25 is adapted for carrying a light reflector, namely, the flat mirror 30. The laser light beam source 38 is located on the adaptive cruise control sensor 4, and directs a laser light beam parallel to and close to the axis of the sensor 4.

Proper operation of a visual aligner system requires that the targets 12 are within the field of view of the cameras in the imaging modules 10. For example, the bar 27 should be of sufficient length to enable the two cameras to see the attached targets 12. In the exemplary VISUALINER 3D, the targets 12 normally must be at least 1.3 m away from the cameras so that the aligner's target acquisition algorithm can detect the targets. The centers of the turntables (not shown) on which the front wheels rest during alignment normally are 2.7 m away from the cameras. As another relevant parameter, for alignment of the cruise control sensor using the laser beam source 38 and the mirror 30, the mirror 30 and the laser 38 must have some minimum separation. For example, typically the element (mirror or laser) that is mounted in front of the vehicle must be 1.2–⅕ m away from the front of the vehicle. Typically, the front of the vehicle protrudes a distance forward from the axis of the front wheels (and thus forward from the centers of the turntables). As a result of this vehicle structure and the parameters of the aligner and the sensor adjustment equipment, the element on the stand may need to be offset from the bar 27 supporting the targets 12. In the example, the apparatus 1 is configured so that during sensor adjustment the mirror 30 is supported at an offset distance further away from the front of the vehicle than the bar 27, and thus from the axis of the targets.

In use, the stand 1 (FIG. 1) is oriented such that the carrier bar 27 faces the front of the host vehicle 5, and the mirror 30 (or the laser) is closest to the aligner. However, one reflective face of the mirror 30 faces toward the host vehicle 5. This arrangement offsets the mirror 30 away from the front of the vehicle 5 and also allows the targets 12 on the bar 27 to be within the acceptable range of distance from the camera modules of the aligner to allow target acquisition.

In this example, the mirror 30 is offset from the carrier bar 27 a distance, which may be approximately 800 cm. The offset accommodates the minimum distance at which the mirror 30 should be located from the laser light beam source 38 of the adaptive cruise control sensor 4, and the offset simultaneously accommodates the minimum distance at which the target plates 12 should be located relative to the cameras in the imaging modules 10 of the 3D aligner 2. The cameras in the 3D aligner 2 are such that the minimum distance between the cameras 10 and the target heads 12 should not be less than 1.3 meters. Additionally, the minimum distance between the mirror 30 and the laser light beam source 38 of the adaptive cruise control sensor 4 should be 1.2 meters to 1.5 meters, to ensure accurate alignment of the adaptive cruise control sensor 4 parallel to the thrust line 14. Since the front of the vehicle may overhang turntables supporting the front wheels of the vehicle by up to one meter, the offset of 800 cm is required to ensure that the target heads will be within the minimum distance of 1.3 meters from the cameras 10, and the mirror will be within the minimum distance of 1.2 meters to 1.5 meters from the adaptive cruise control sensor 4 which is normally mounted in the bumper of the vehicle 5. However, it will be readily apparent to those skilled in the art that other offsets between the mirror 30 and the carrier bar 27 may be used, depending on the particular model of aligner system 2 that is used. Indeed, in certain cases, it is envisaged that the mirror 30 may be mounted relative to the carrier bar 27 without any offset, if the adjustment elements 30, 38 and the aligner 2 will function properly with the resulting separations.

In this example, the mirror 30 is carried on a vertically extending mounting member 31, which is rotatably carried on the secondary framework 25 about a vertical axis 33 for facilitating alignment of the mirror 30 with the carrier bar 27 during calibration of the apparatus 1, so that the mirror 30 extends parallel to the carrier bar 27. In such an orientation, an axis of the targets 12 on the bar 27 is perpendicular to an axis of direct (perpendicular) reflection of the surface of the mirror 30. If the stand supported the laser beam source, the beam axis would be perpendicular to the axis through the targets on the bar 27. A screw adjusting mechanism 32 extends between the mirror 30 and the secondary framework 25 for facilitating adjustment of the mirror 30 (or laser beam source) about the vertical axis 33 relative to the carrier bar 27.

The central pedestal 22 comprises a pair of upstanding spaced apart support members 34 which extend upwardly from the ground engaging framework 20 which slidably carry a central pod 35 extending downwardly from the secondary framework 25. A clamping member 36 clamps the central pod 34 to the support members 34 for locating the secondary support framework 25 at a desired height above the ground engaging framework 20.

The secondary framework 25 is rotatably carried on the central pod 35, and is rotatable relative to the central pod 35 about a vertical axis 37. A clamping mechanism (not shown) is provided for clamping the secondary framework 25 relative to the central pod 35, when the secondary framework 25 is in a position with the carrier bar 27 extending perpendicularly to the thrust line 14 of the vehicle 5 as will be described below. Alternatively, a screw or other rotational adjustment and securing mechanism could be provided In use it is assumed that the reflecting face of the mirror 30 is parallel to the axis of the bar 27. Procedures for calibrating the apparatus 1 for such alignment are discussed, later. During sensor adjustment, essentially, the wheel aligner 2 is used to align the bar, and thus the mirror face, perpendicular to the vehicle thrust line. The laser 38 is mounted on the sensor 4 in close alignment with the axis thereof. When the source 38 emits the laser light beam, the beam reflects back off the face of the mirror 30. The sensor 4 is then adjusted, and the technician observes the spot of the reflected laser beam as it impacts on the front of the vehicle 5, until the light beam essentially reflects directly back on itself (back to its point of origin). At this point, the laser beam and the sensor axis are perpendicular to the face of the mirror 30 and thus parallel to the vehicle thrust line. A more detailed description of several examples of the sensor alignment procedures follows.

Figure 2:
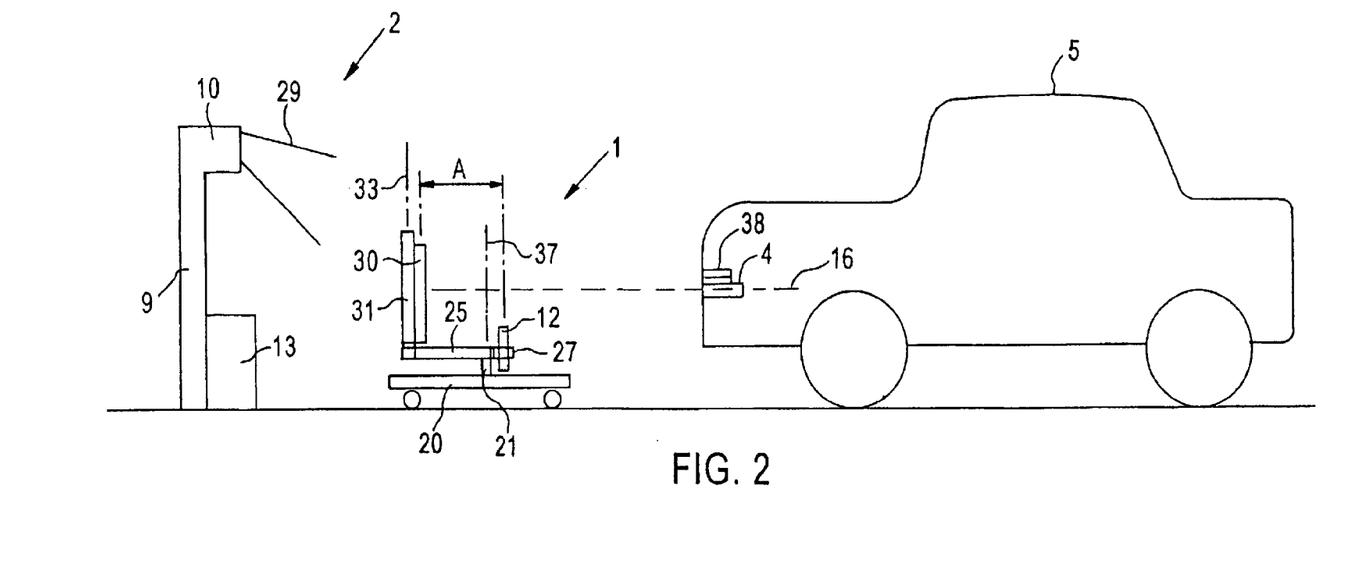
FIG. 2 is a diagrammatic side elevational view of the wheel aligner, which shows the apparatus of FIG. 1 in use for facilitating alignment of the adaptive cruise control sensor of the vehicle.
Figure 3:
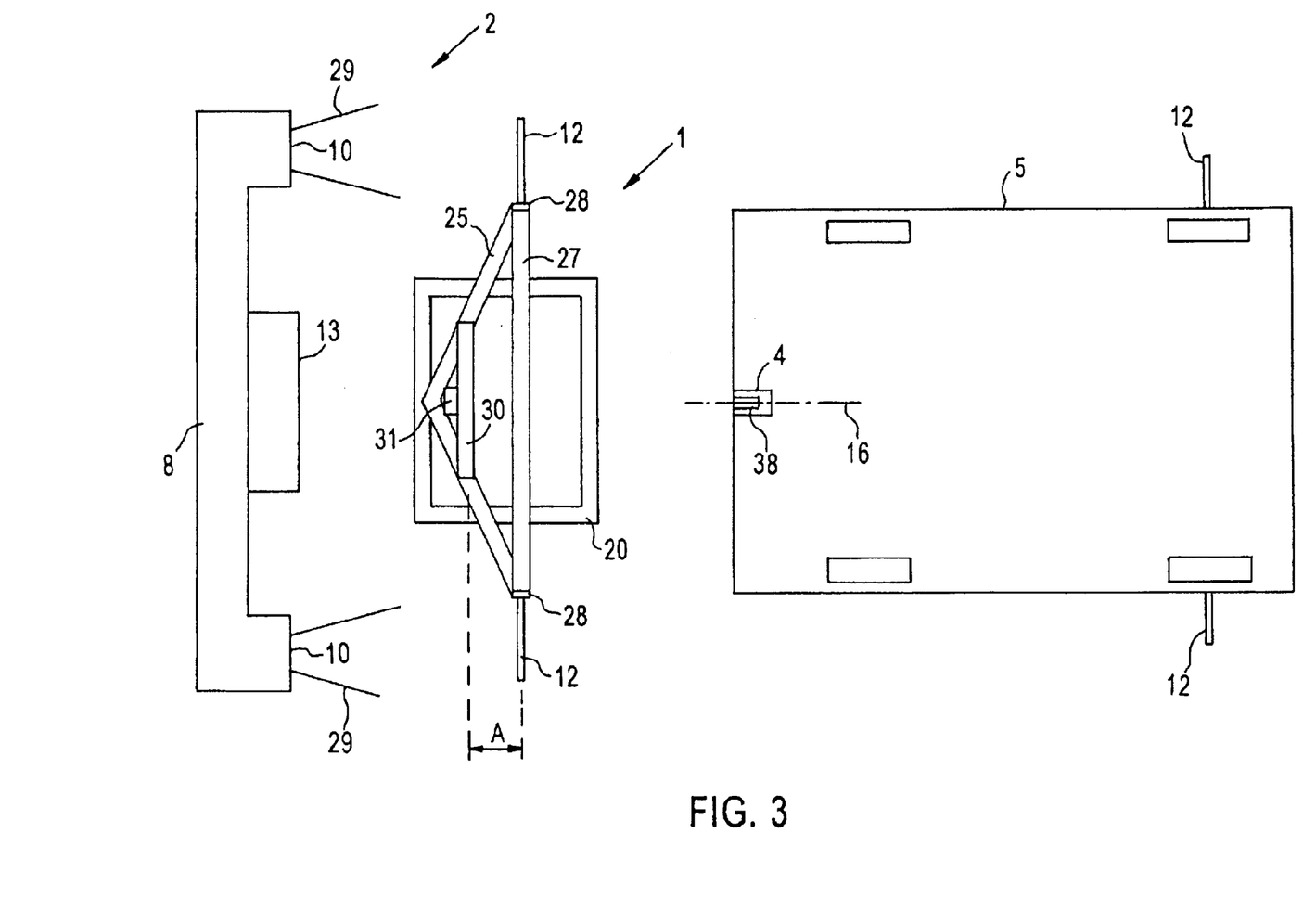
FIG. 3 is a diagrammatic plan view of the 3D image wheel aligner of FIG. 2 illustrating the apparatus of FIG. 1 in use.

One example involves performing a sensor adjustment at the end of a normal wheel alignment procedure. Specifically, with the vehicle 5 of which the adaptive cruise control sensor 4 is to be aligned is located relative to the 3D aligner 2 as illustrated in FIGS. 2 and 3. The front and rear wheels of the vehicle 5 are set at the correct toe angles, and in turn the angle α of the thrust line 14 relative to the central angle 15 (see FIG. 4) is computed by the computer of the aligner 2. After having carried out this normal wheel alignment using the 3D image aligner, the plane data of the rear wheel targets must be saved on the aligner's computer. By saving this data, we preserve the coordinate system for reference and also the value of the thrust angle measured during the wheel alignment. The thrust angle α is also stored.

The apparatus 1 is then wheeled into position between the front of the vehicle 5 and the cameras 10 of the 3D aligner 2, as shown for example in FIGS. 2 and 3.

The target heads 12 are transferred from the front wheels of the vehicle 5 to the respective ends of the carrier bar 27 and are rotated about a horizontal axis until it is aligned with the camera in the respective imaging module 10 of the 3D aligner 2. The secondary framework 25 is pivoted relative to the central pod 35, about the vertical axis 37, until the 3D aligner 2 determines from the position of the target plates 12 that the carrier bar 27 is extending exactly perpendicularly to the thrust line 14 of the vehicle.

For this purpose, the technician manipulates the targets 12 on the carrier bar 27 and performs a double or single wheel positioning operation with the aligner 2, to acquire the target toe vector orientations in space as if the apparatus 1 included the front wheels of a vehicle. The thus simulated vehicle includes the back wheels of the host vehicle 5 and front wheels simulated by the bar 27 and mounting members 28 of the apparatus 1. The choice between single or double wheel positioning depends on the type of apparatus used (e.g. FIG. 1 or FIG. 8). The technician then rotates the bar 27 with the targets 12 about the vertical axis, and repeats the simulated wheel positioning and toe vector measurement for the apparatus 1, until the individual front toe values have equal sign and magnitude. Once this condition has been met the device 1 is orientated so that the reflective surface of the mirror 30 is perpendicular to the thrust line.

At this stage the carrier bar 27 may be clamped in position by the clamping arrangement (not shown) which clamps the secondary framework 25 rigidly in place relative to the central pod 35. With the carrier bar 27 extending transversely and perpendicularly to the thrust line 14, the mirror 30 also extends perpendicularly to the thrust line 14. At this stage the apparatus 1 is located ready to adjust the alignment of the adaptive cruise control sensor 4 for the sensor alignment as per its own instructions.

The laser light beam source 38 on the adaptive cruise control sensor 4 is activated and the light beam is directed onto the mirror 30. The technician observes the reflected light beam from the mirror 30, and if the reflect beam does not coincide with the laser light beam originating from the source 38, the technician adjusts the orientation of the adaptive cruise control sensor 4 until the reflected beam from the mirror 30 coincides with the laser light beam from the source 38. At that stage the adaptive cruise control sensor 4 and its axis are accurately aligned and parallel with the thrust line 14.

An alternative methodology involves direct sensor alignment, without a preceding normal wheel alignment. In this exemplary technique, a technician performs complete roll-back procedure on the vehicle 5, using all four targets 12. The automobile is positioned and measured first followed by positioning of the alignment stand. The aligner may use a single or a double wheel positioning operation on the apparatus 1 depending on the type of stand used in the process (e.g. FIG. 1 or FIG. 8).

In this case, a complete coordinate system is established by the aligner, using both front and rear base planes. The stand is rotated until the individual toe values of the stand targets (front targets) are of equal sign and magnitude, as outlined in the discussion of the first methodology. The axis of the targets on the bar 27 and the parallel reflecting surface of the mirror 30 are perpendicular to the vehicle's thrust line at this orientation, and the sensor 4 can be aligned as per its own adjustment instructions. Typically, this entails adjusting the angular position of the sensor and thus of the associated laser 38, until the beam reflected by the mirror 30 coincides with the beam originating from the laser 38, in a manner similar to the sensor adjustment technique discussed above with regard to the first exemplary alignment method.

Another methodology uses setback measurements in the alignment of the apparatus 1 for sensor adjustment. This approach is similar to that of the first method, in that it follows a normal wheel alignment measurement, but this example uses a different technique to determine the angle for alignment of the carrier perpendicular to the vehicle's thrust line.

Figure 5:
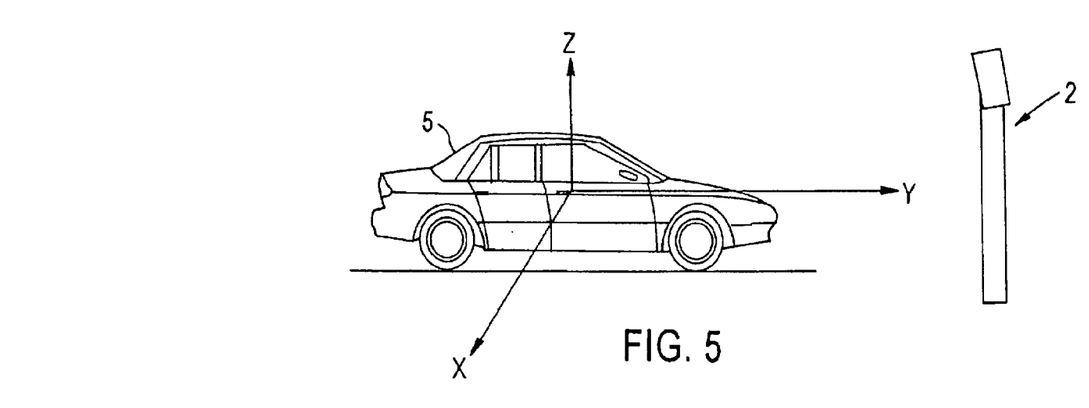
FIG. 5 is a perspective view of a vehicle and an aligner useful in explaining the coordinate system utilized in certain measurements.

The vehicle co-ordinate system (Base plane co-ordinate system BPCS) is defined in FIG. 5. In that coordinate system, Y points out from the vehicle 5 towards the aligner 2. The orientation of the stand can be measured by making use of the set-back measurement already in use during a normal alignment.

Figure 4:
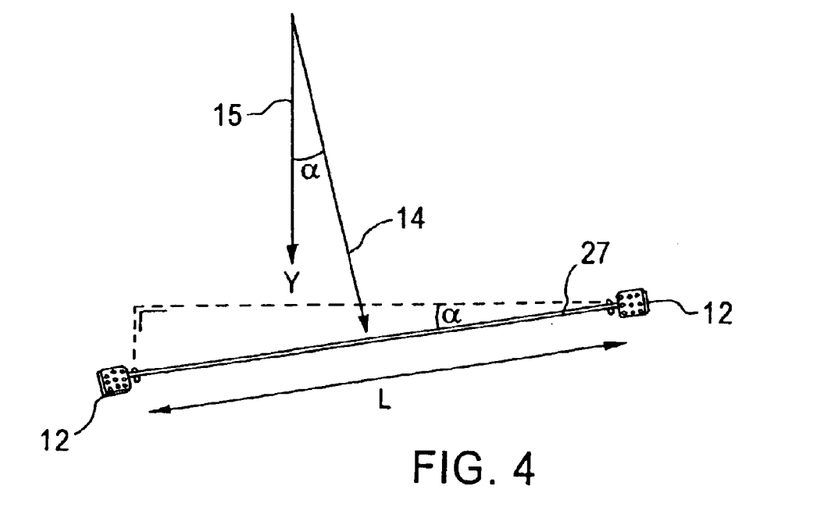
FIG. 4 is a diagrammatic plan view illustrating the relative position of the thrust line to the central axis of the vehicle.

In FIG. 4, the y-axis of the vehicle co-ordinate system is shown, which also corresponds to the geometric centerline of the vehicle. The thrust line is also shown relative to this axis. In order to align the stand with the arm and the mirror perpendicular to the thrust line, the angle α must be set equal to the value of the thrust line. The operation of aligning the apparatus 1 will then amount to determining the angle α and indicating to the user when the apparatus is in this position.

We can determine the angle α from the triangle shown in the diagram of FIG. 4. The aligner 2 is capable of measuring the distance between the two targets 12 and also the distance apart they are along the y-axis. The distance apart along the y-axis is equivalent to the setback measurement in the aligner software. Using this information we calculate the angle α as follows:

$$\alpha = \arcsin(S/L)$$

We can update the value of a from this computation, as the stand is being positioned, by updating the measured values of S and L and calculating α for each position. The changes in α may then be represented by a dial or indicator showing the user how close he is to positioning the stand at the correct orientation.

When the aligner 2 indicates the correct orientation, the mirror face again is perpendicular to the thrust line; and the apparatus 1 can be used to adjust the angular orientation of the sensor 4. Again, the sensor adjustment entails adjusting the angular position of the sensor and thus of the associated laser 38, until the beam reflected by the mirror 30 coincides with the beam originating from the laser 38, in a manner similar to the adjustment technique discussed above with regard to the first exemplary method.

Figure 6:
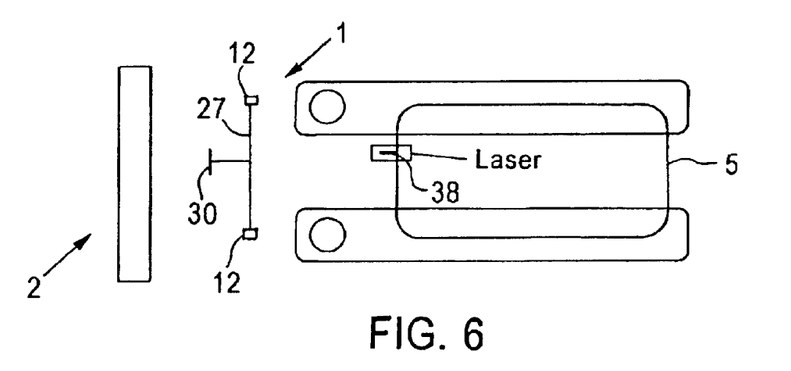
FIGS. 6 and 7 are diagrammatic plan views of the wheel aligner of FIG. 2 and the apparatus of FIG. 1 in use during calibration.
Figure 7:
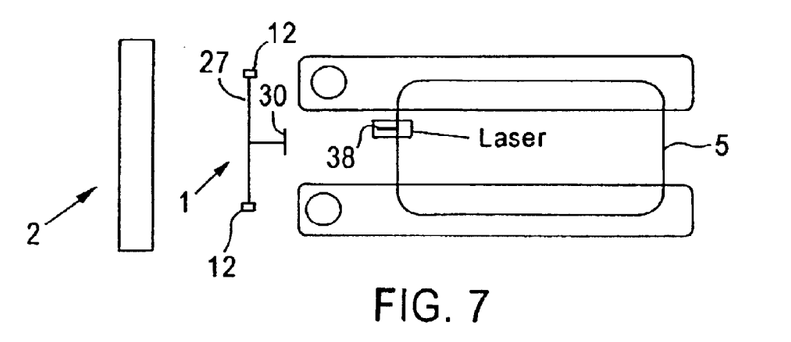

To support the sensor adjustment operations, it may periodically be necessary to adjust the parallel alignment of the mirror 30 with respect to the carrier bar 27, for example, in case the mirror 30 is bumped out of alignment with the carrier bar 27. The calibration may use a set-up of the apparatus 1 in relation to a vehicle, as already described. Alternatively, the calibration utilizes a calibration bar 5' (such as an RCP check bar) as shown in FIGS. 6 and 7. For convenience, the rear targets are omitted from FIGS. 6 and 7.

The rear targets are mounted on the calibration bar 5' towards the rear of the lift. The mirror 30 is a double-sided mirror, and the front targets 12 are mounted on the stand as discussed earlier. Initially, the apparatus 1 is placed in its normal position between the rack and the aligner 2, and the aligner is operated in a normal fashion to perform a positioning determination on all four targets. The stand and the targets 12 mounted thereon are manipulated and imaged as described above until the measured front toe values corresponding to the apparatus 1 become equal and of the same sign. The apparatus 1 is now aligned with the front mirror surface perpendicular to the virtual vehicle thrust line of the apparatus 1 and the bar 5'. The calibration then entails directing the laser light beam from the source 38 at the mirror 30 and adjusting the orientation of the laser 38 until the reflected light from the mirror coincides with the laser light beam.

The support framework 35 is then rotated about the central pod 35 about the vertical axis 37 through 180° as illustrated in FIG. 7. The mirror 30 is on the opposite side of the bar 27, and the back face of the double-sided mirror 30 is facing toward the laser 38. To insure that the stand position is accurate, the stand and the targets 12 mounted thereon are again manipulated and imaged as described above until the measured front toe values corresponding to the apparatus 1 become equal and of the same sign. However, to this point, the orientation of the laser 38 has not been further adjusted.

The laser light beam 38 is again directed towards the mirror 30, without further adjustment of the laser beam source 38. If the laser beam reflects back along its path to the source 38, the stand is calibrated, and the mirror 30 is aligned parallel to the target carrier bar 27.

However, if the reflected beam does not coincide with the beam originating from the source 38, then the mirror is adjusted on the stand in relation to the bar 27, by approximately one-half the angular error. Then the process is repeated to determine again if the mirror 30 is parallel to the bar 27. The entire sequence may be repeated several times until the reflection of the beam in both front (FIG. 6) and back (FIG. 7) positions results in coincidence of the reflected beam with the beam from the source 38. When the beams coincide in both orientations of the apparatus 1, the positioning of the mirror 30 on the stand and thus in relation to the bar 27 confirms correct parallelism between the surface of the mirror 30 and the axis of the bar 27, and the apparatus 1 is properly calibrated.

Figure 8:
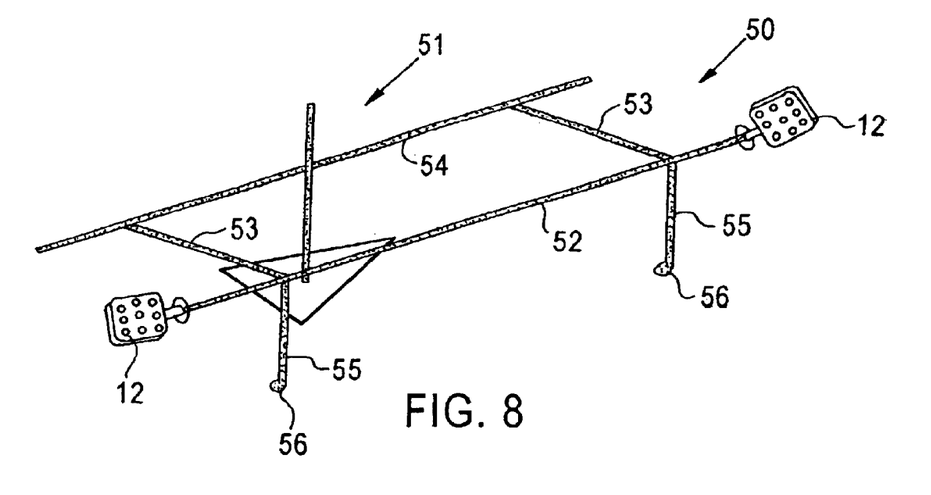
FIG. 8 is a perspective view of another apparatus according; to the present concepts for facilitating alignment of an adaptive cruise control sensor of a motor vehicle.

Turning now to FIG. 8, there is illustrated an arrangement according to the present teachings, for adapting the apparatus disclosed in German Patent Specification No. 19857871 of Beissbarth to operate in conjunction with the 3D image wheel aligner or the like. The device 50 is particularly suitable for adapting the apparatus 22 of FIG. 4 of the German Specification No. 19857871. The portion of the device used from the German Specification, to support the laser beam source, is indicated generally by the reference numeral 51 in FIG. 8 of this case.

As shown in FIG. 8 of this case, the stand for the targets and the laser (or mirror) comprises a carrier bar 52 similar to the carrier bar 27. The bar 50 enables mounting of the target heads 12 at respective opposite ends thereof, for alignment with the imaging modules and for rotation for toe measurements as described earlier. In this arrangement, the targets are independently rotatable, rather than rotatable with the bar 52, hence, the stand alignment requires double wheel positioning type manipulations for using the toe measurements.

The stand here includes a secondary support framework comprising a pair of longitudinal mounting bars 53 extending from the carrier bar 52 to a cross bar 54. The bar 52 secures the framework and thus the carrier bar 52 to the vertical element of the apparatus 51. The framework formed by the bars 52, 54 together with the vertical member of the device 51 form the secondary support for the laser beam source. The framework formed by the bars 52, 54 together with the carrier bar 52 form a rectangle. The vertical element of the apparatus 51 attaches to the bar 54, by welding of an appropriate clamp, near a mid-point of the back edge of the rectangle formed by the bars.

Support members 55 extend downwardly from the carrier bar 52 and terminate in ground engaging castors 56. The vertical support members 55, castors 56 and the base plate of the device 51 together form the primary support, in the system shown in FIG. 8. Otherwise, once the device 50 is mounted to the apparatus 51 of Beissbarth as illustrated in FIG. 8, the apparatus 51 of Beissbarth is operable in a fashion generally similar to the apparatus 1 described above. Of course, if the beam source is mounted on the stand, the mirror is associated with the sensor and adjusted until the beam and the reflection coincide.

Those skilled in the art will recognize that the techniques described herein may be adapted to other applications. For example, the stand and adjustment elements could be used in combination with a visual image processing type system to align other types of sensors, e.g. including other sensors that may now or in future appear at different locations on various types of vehicles.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An apparatus for use with an image processing wheel aligner, for facilitating alignment of an adaptive cruise control sensor on the front of a host vehicle, the apparatus comprising:

a primary support for positioning between one or more image sensors of the wheel aligner and the front of the host vehicle;

a secondary support located on the primary support for carrying one of a laser light beam source and a light reflector for co-operating with the other of the laser light beam source and the light reflector associated with the adaptive cruise control sensor on the host vehicle for aligning the adaptive cruise control sensor axis parallel to the thrust line of the host vehicle; and a carrier located on the secondary support, for carrying two optical targets of the image processing wheel aligner at transversely spaced apart locations relative to a longitudinal central axis of the vehicle for facilitating alignment of the one of the laser light beam source and the light reflector relative to the thrust line of the host vehicle.

2. The apparatus of claim 1, wherein:

the secondary support and the carrier are configured to provide a longitudinal offset between the one of the laser light beam source and the light reflector carried by the secondary support and a horizontal axis through the two optical targets, the offset being sufficient that, when the primary support is positioned between one or more image sensors and the front of the host vehicle, there is a necessary separation between the one or more image sensors and the two optical targets, and there is a necessary separation between the laser light beam source and the light reflector.

3. The apparatus of claim 1, wherein the secondary support is adapted for mounting the light reflector such that the light reflector is aligned perpendicular to the thrust line of the vehicle so that light incident on the light reflector from the laser light beam source is reflected back along its own path when a laser light beam incident on the light reflector is parallel to the thrust line.

4. The apparatus of claim 1, wherein the carrier comprises means for enabling rotation of the two optical targets about a substantially horizontal axis.

5. The apparatus of claim 1, wherein the carrier comprises a transverse bar rotatably mounted on the secondary support.

6. The apparatus of claim 1, wherein the secondary support is mounted on the primary support for rotatable adjustment about a vertical axis relative to the primary support.

7. The apparatus of claim 1, wherein the carrier is configured for mounting the targets spaced apart by a distance approximately corresponding to a distance the targets would be spaced apart if mounted on opposite wheels of the host vehicle.

8. The apparatus of claim 1, wherein the secondary support is height adjustable relative to the primary support.

9. The apparatus of claim 1, further comprising:

a mounting means on the secondary support, for carrying the one of the laser light beam source and the light reflector, the mounting means enabling pivotal movement of the one of the laser light beam source and the light reflector relative to the secondary support, for aligning the one of the laser light beam source and the light reflector relative to the carrier.

10. The apparatus of claim 1, wherein:

the carrier comprises a carrier bar;

the secondary support comprises a plurality of bars, which together with the carrier bar form a rectangular framework;

the primary support comprises two or more support members vertically supporting corners of the rectangular framework; and the secondary support comprises a vertical member attached along a bar of the secondary support opposite the carrier bar.

11. The apparatus of claim 1, wherein the primary support comprises:

a ground engaging framework; and a pedestal attached to the framework, the pedestal carrying the secondary support.

12. Apparatus for use with an image processing aligner, for facilitating alignment of a sensor on a portion of a host vehicle, the apparatus comprising:

two optical adjustment elements for aligning an axis of the sensor parallel to a predetermined line of the host vehicle, a first one of the adjustment elements being for mounting on the vehicle in alignment with an axis of the sensor and for movement with adjustment of orientation of the sensor; and a stand for positioning between one or more image sensors of the wheel aligner and the portion of the host vehicle, the stand comprising:

(a) a ground engaging framework;

(b) a support coupled to the framework, for carrying a second one of the adjustment elements in an orientation facilitating cooperation with the first adjustment element when mounted on the vehicle; and (c) a carrier, for carrying two optical targets of the image processing wheel aligner at transversely spaced apart locations relative to the host vehicle for facilitating alignment of an axis of the second adjustment element relative to the predetermined line of the host vehicle using the image processing aligner.

13. The apparatus as in claim 12, wherein the framework includes a vertical pedestal, the support is mounted on the pedestal, and the carrier is mounted on a portion of the support.

14. The apparatus of claim 13, wherein the carrier comprises a horizontal bar, and target mounting members attached at opposite ends of the horizontal bar.

15. The apparatus of claim 14, wherein the horizontal bar is rotatably mounted on the support.

16. The apparatus as in claim 12, wherein:

the ground engaging framework comprises at least two vertical support members;

elements of the support and the carrier together form a rectangle supported in at least two corners by the vertical support members; and the support further comprises a vertical member attached to one of the elements along an edge of the rectangle opposite the carrier, for supporting the second adjustment element.

17. A system for aligning an adaptive cruise control sensor mounted on the front of a host vehicle, the system comprising:

an image processing wheel aligner comprising one or more image sensors and a processor for processing image signals from the one or more image sensors to compute alignment parameters;

two optical targets for imaging by the image processing wheel aligner;

two optical adjustment elements for cooperating to align an axis of the adaptive cruise control sensor parallel to a thrust line of the host vehicle, a first one of the optical adjustment elements being mountable in alignment with an axis of the adaptive cruise control sensor and for movement with adjustment of the adaptive cruise control sensor; and a stand for location between the front of the host vehicle and the one or more image sensors, the stand mounting a second one of the optical adjustment elements and mounting the optical targets at transversely spaced apart locations relative to a longitudinal central axis of the host vehicle to enable imaging of the targets on the stand to allow use of the aligner to facilitate alignment of the second of the optical adjustment elements relative to the thrust line of the host vehicle.

18. The system as in claim 17, wherein the stand comprises:

a ground engaging framework having a vertical pedestal;

a support mounted on the pedestal, for carrying the second one of the adjustment elements; and a carrier mounted on the support, for rotatably mounting of the two optical targets of the image processing wheel aligner at the transversely spaced apart locations.

19. The system as in claim 17, wherein the stand comprises:

a ground engaging base plate;

a vertical member supported by the base plate for mounting the second one of the optical adjustment elements;

one or more vertical ground engaging members supporting the carrier; and a frame attaching the vertical ground engaging members and the carrier to the vertical member supported by the base plate.

20. The system as in claim 17, wherein:

the first optical adjustment element comprises a laser beam source; and the second optical adjustment element comprises a beam reflector.

21. A method of aligning of an adaptive cruise control sensor mounted on the front of a host vehicle, the method comprising steps of:

mounting a first of two optical adjustment elements in alignment with an axis of the adaptive cruise control sensor and for movement with adjustment of the adaptive cruise control sensor, a second of the two adjustment elements being mounted on a stand;

mounting two optical targets of an image processing wheel aligner on the stand, at determined transversely spaced apart locations relative to an axis of the second adjustment element;

positioning the stand with the second adjustment element and the targets between the front of the host vehicle and one or more image input devices of the image processing wheel aligner, wherein the optical targets are located so as to allow imaging thereof by the image processing wheel aligner to determine one or more alignment parameters;

obtaining and processing one or more images of the optical targets in the image processing wheel aligner and adjusting the position of the stand, until the image processing wheel aligner indicates that the axis of the second adjustment element is in predetermined alignment relative to the thrust line of the host vehicle;

transmitting a beam of light between the two adjustment elements; and during transmission of the beam of light, adjusting the position of the sensor and the aligned adjustment element until the beam of light is positioned so as to indicate a desired alignment of the axis of the adaptive cruise control sensor relative to the thrust line of the host vehicle.

22. The method of claim 21, wherein the step of mounting two optical targets comprises mounting the targets at opposite ends of an arm mounted on the stand perpendicular to the axis of the second adjustment element.

23. The method of claim 21, wherein the step of obtaining and processing one or more images comprises:

rotating the two optical targets about an axis perpendicular to the axis of the second adjustment element;

obtaining images of the targets at at least two rotational positions; and processing the images of the targets at the at least two rotational positions to determine orientation of the perpendicular axis.

24. The method of claim 21, further comprising operating the image processing wheel aligner to determine the thrust line of the host vehicle.

25. The method as in claim 21, wherein the two adjustment elements comprise a light beam source and a mirror for reflecting the light beam.

26. The method as in claim 25, wherein:

the light beam source serves as the first adjustment element; and the mirror serves as the second adjustment element.

27. The method of claim 26, wherein the step of adjusting the position of the sensor and the aligned adjustment element comprises:

observing a beam reflected to the front of the host vehicle by reflection of the light beam from the light beam source by the mirror; and adjusting the position of the sensor and the aligned adjustment element until the reflected beam coincides with the light beam from the light beam source.

* * * * *